Figure 4:
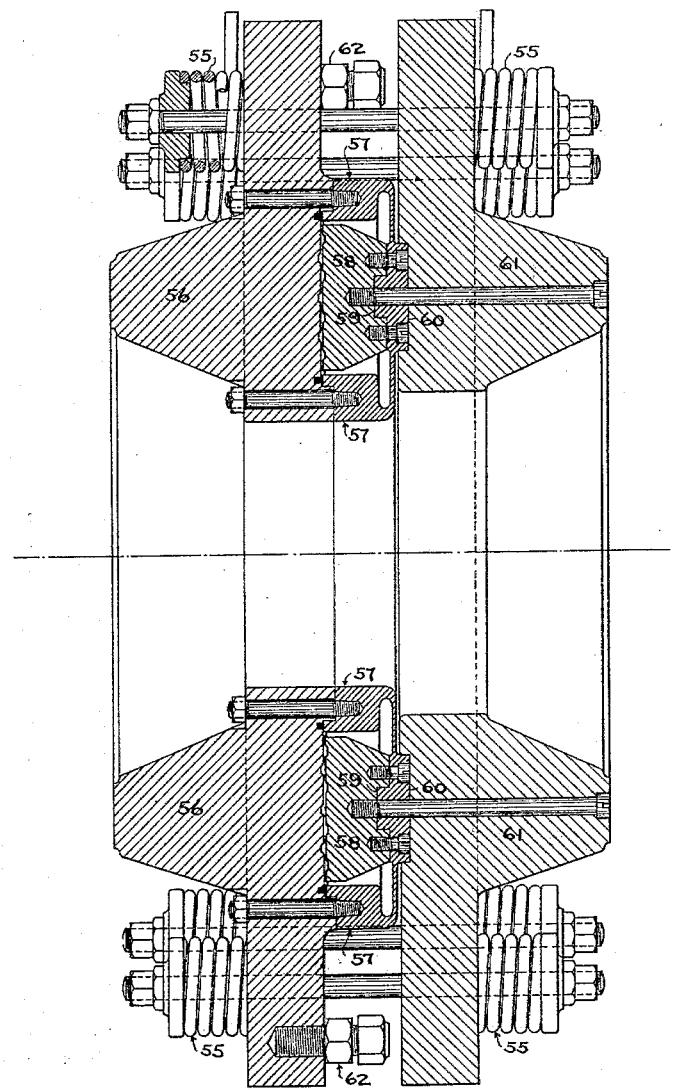

(No Model.) 11 Sheets—Sheet 1.
W. SELLERS, J. S. BANCROFT & C. G. BARTH.
TESTING MACHINE.
No. 552,873. Patented Jan. 7, 1896.
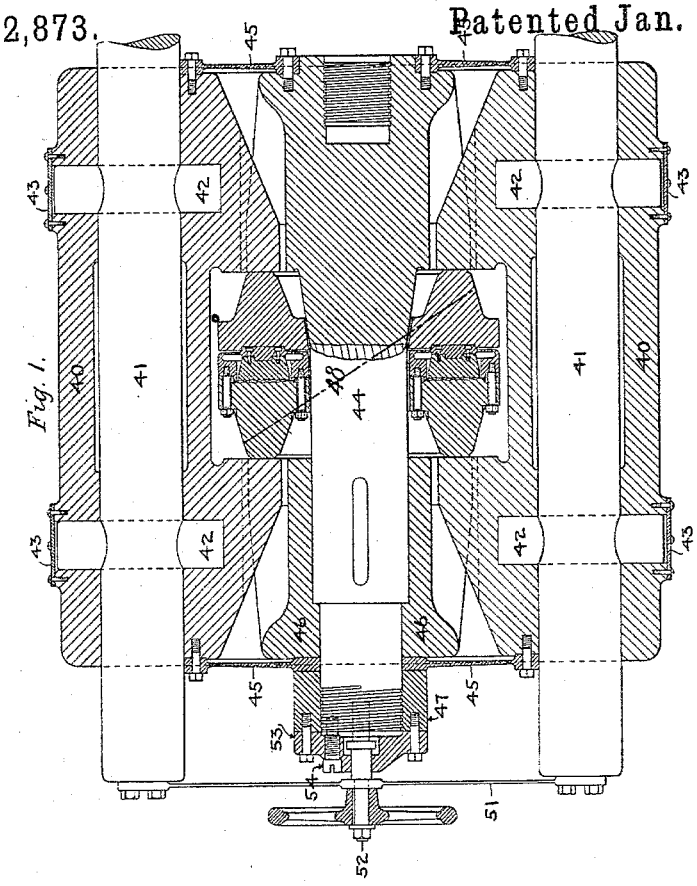
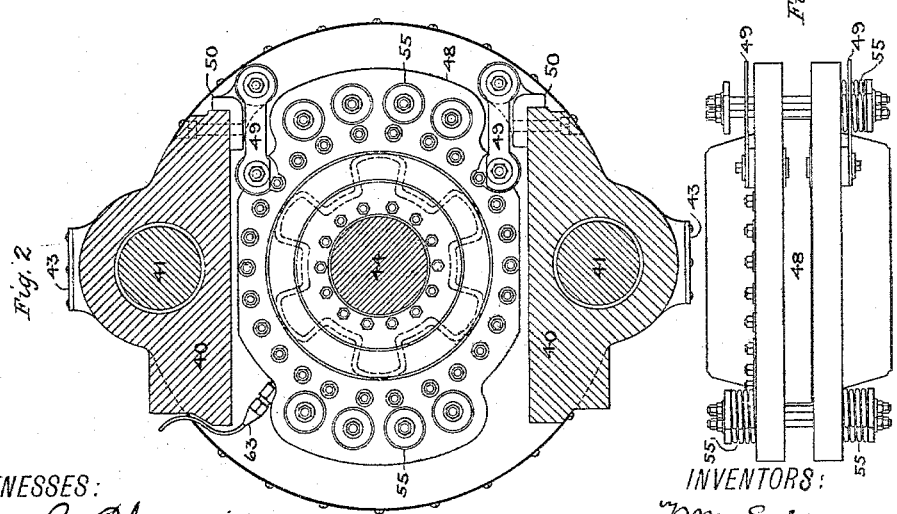
WITNESSES:
John L. Phillips
W H Hassenpflug
INVENTORS:
Wm Sellers
J. Sellers Bancroft
Carl G. Barth.

(No Model.) 11 Sheets—Sheet 2.

W. SELLERS, J. S. BANCROFT & C. G. BARTH.
TESTING MACHINE.

No. 552,873. Patented Jan. 7, 1896.

WITNESSES:
John L. Phillips
W H Hassenpflug

INVENTORS:
Wm Sellers
J. Sellers Bancroft
Carl G. Barth.

(No Model.) 11 Sheets—Sheet 3.
W. SELLERS, J. S. BANCROFT & C. G. BARTH.
TESTING MACHINE.
No. 552,873. Patented Jan. 7, 1896.
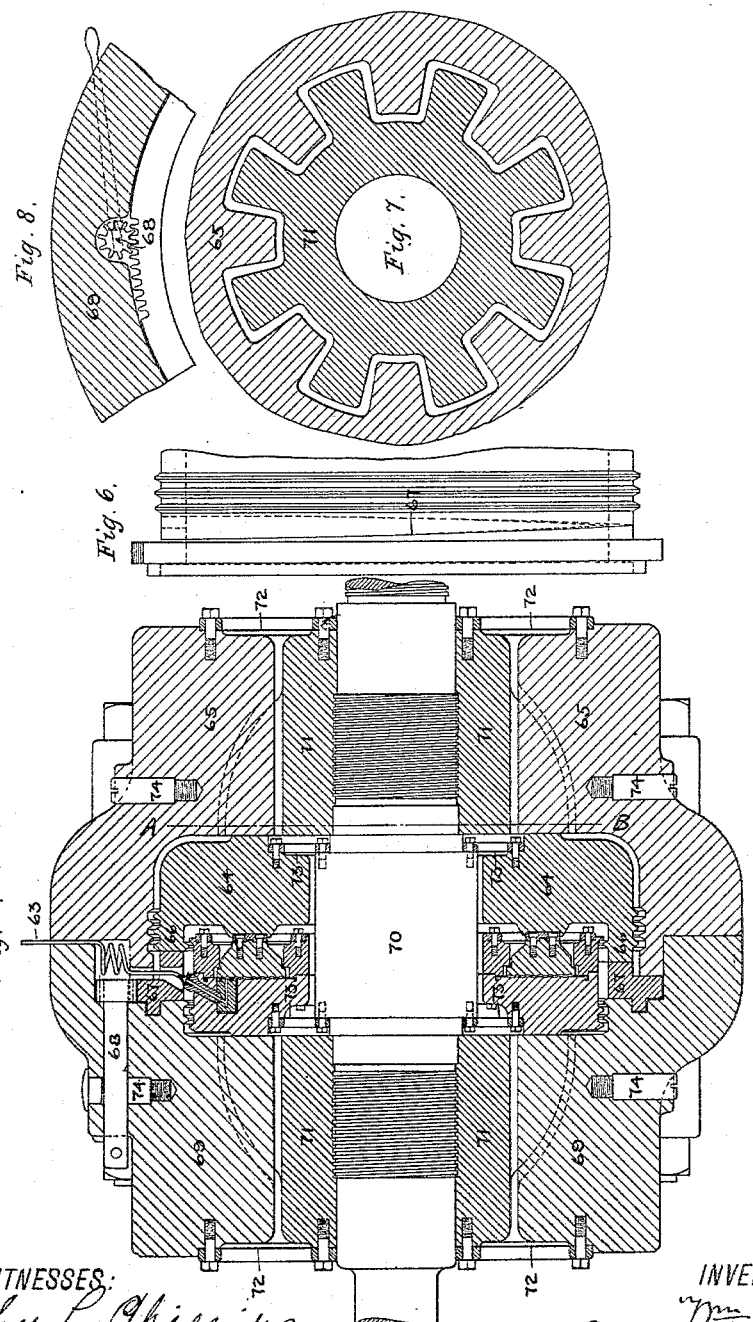
WITNESSES:
John L. Phillips
W. H. Hassempflug
INVENTORS:
Wm Sellers
J. Sellers Bancroft
Carl G. Barth (No Model.) 11 Sheets—Sheet 4.
W. SELLERS, J. S. BANCROFT & C. G. BARTH.
TESTING MACHINE.
No. 552,873. Patented Jan. 7, 1896.
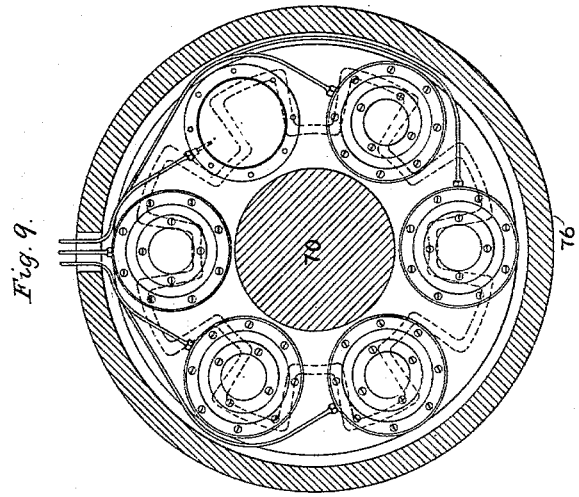
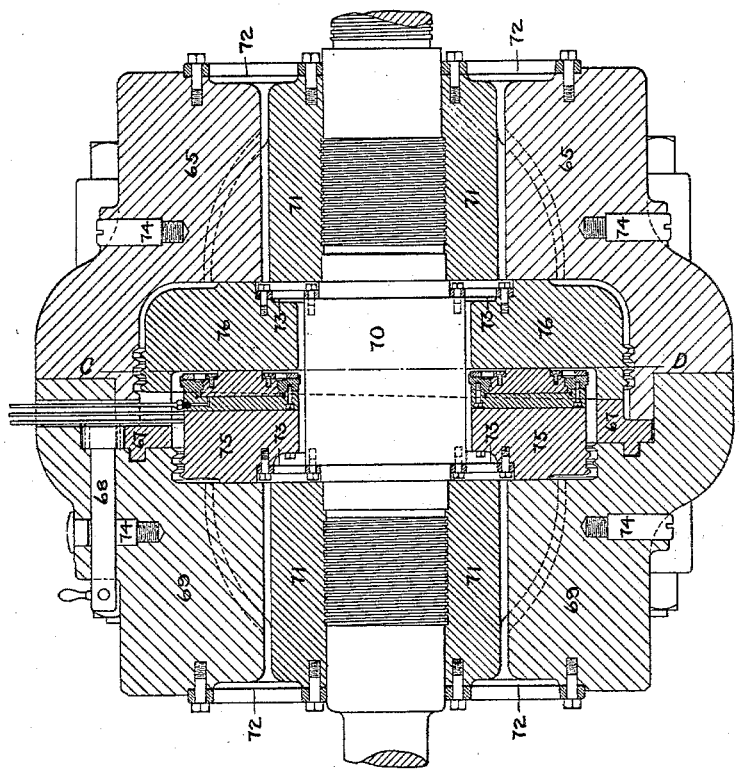
WITNESSES:
John L. Phillips
W. H. Hassenpflug
INVENTORS:
Wm Sellers
J. Sellers Bancroft
Carl G. Barth

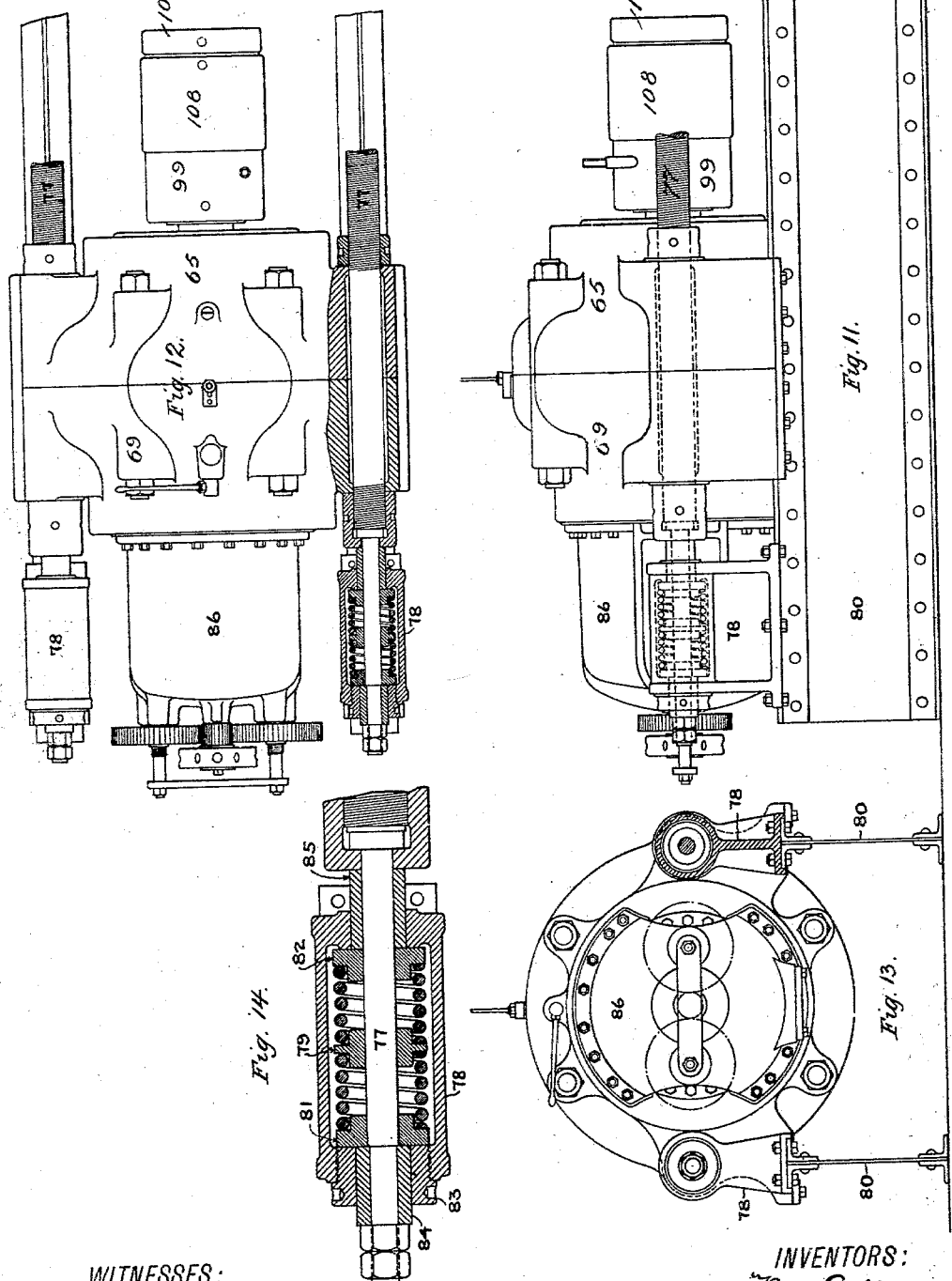

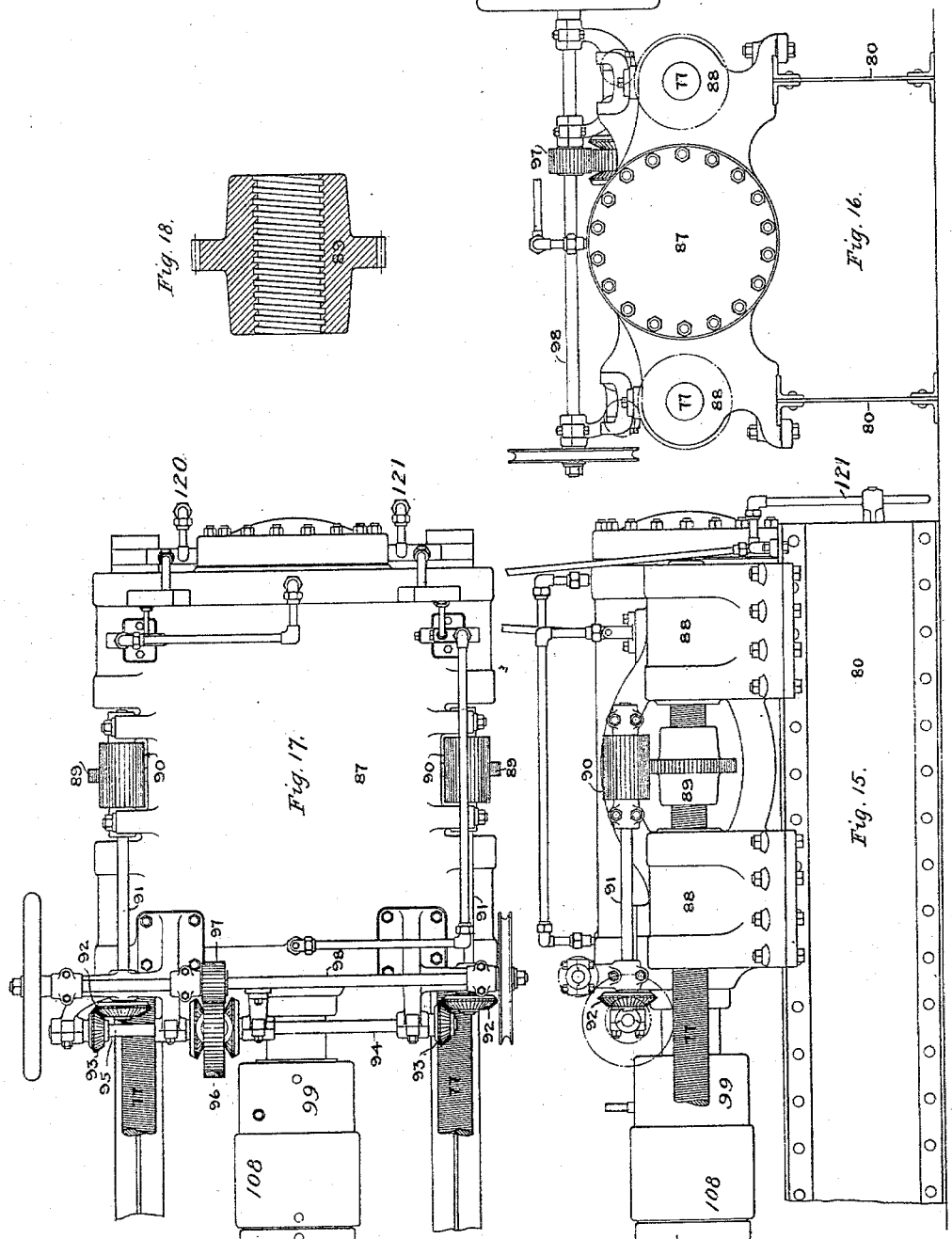

(No Model.) 11 Sheets—Sheet 7.
W. SELLERS, J. S. BANCROFT & C. G. BARTH.
TESTING MACHINE.
No. 552,873. Patented Jan. 7, 1896.
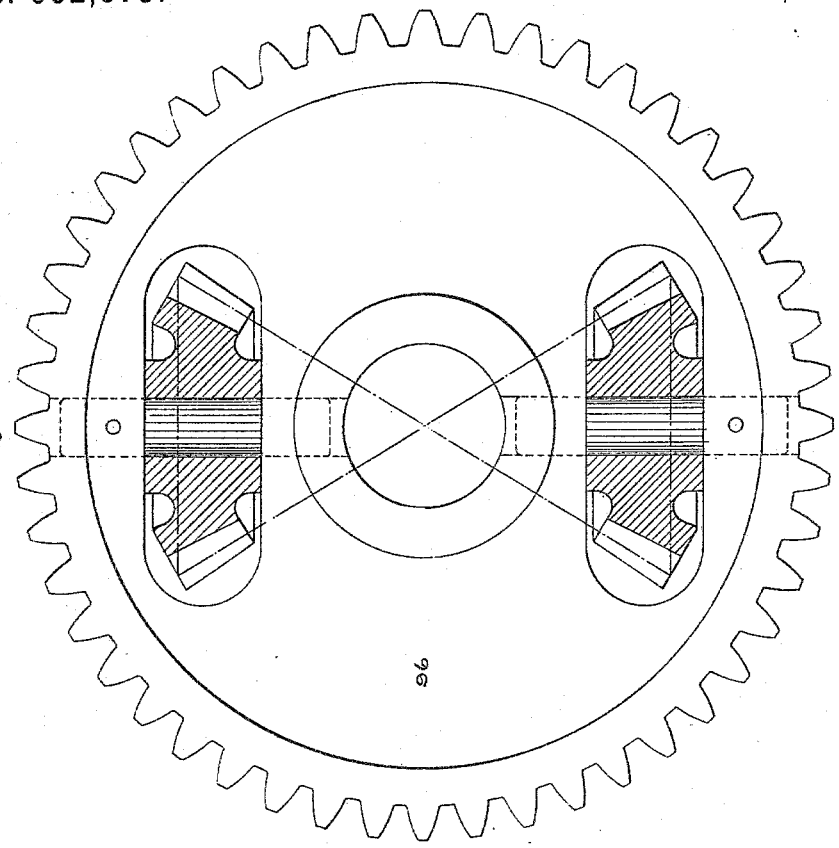
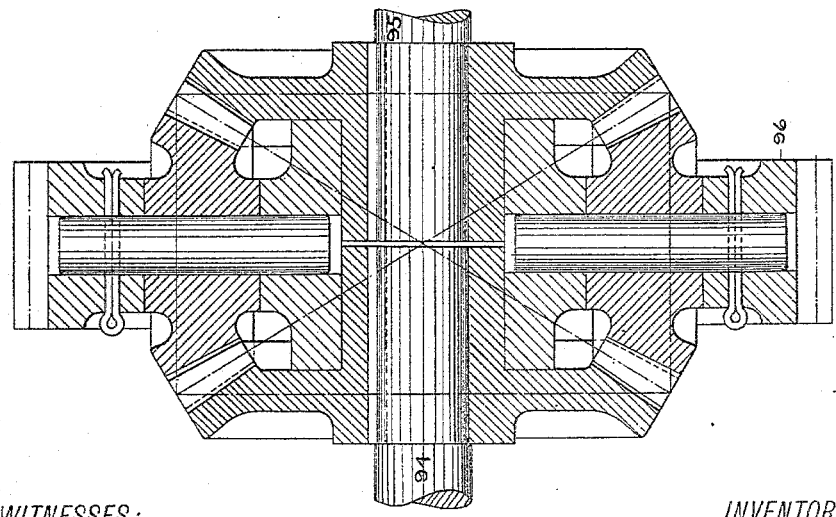
WITNESSES:
INVENTORS:

(No Model.) 11 Sheets—Sheet 8.
W. SELLERS, J. S. BANCROFT & C. G. BARTH.
TESTING MACHINE.
No. 552,873. Patented Jan. 7, 1896.
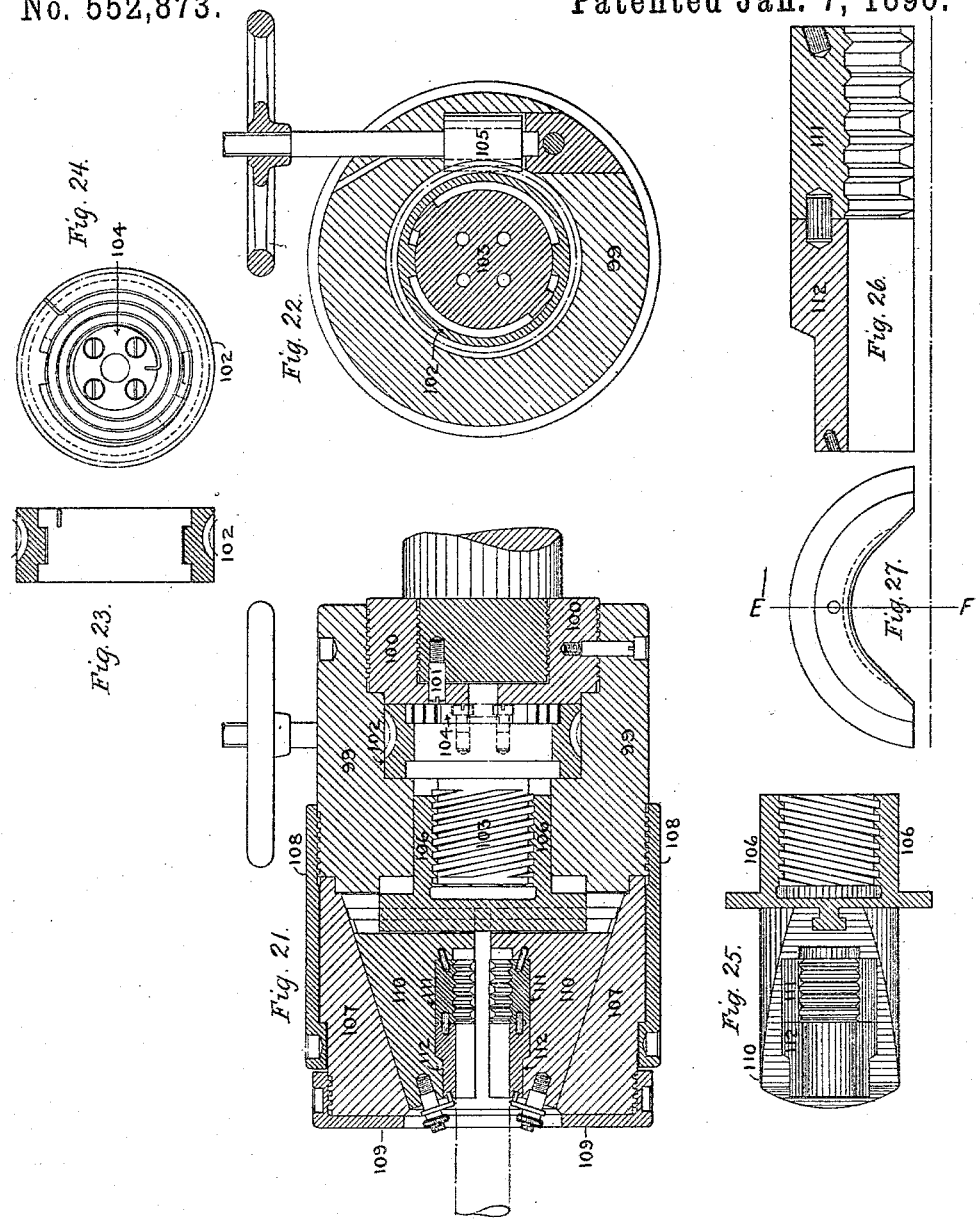
WITNESSES:
John L. Phillips
W H Hassenpflug
INVENTORS:
Wm Sellers
J. Sellers Bancroft
Carl G. Barth (No Model.) 11 Sheets—Sheet 9

W. SELLERS, J. S. BANCROFT & C. G. BARTH.
TESTING MACHINE.

No. 552,873. Patented Jan. 7, 1896.

WITNESSES:
John L. Phillips
W. H. Hassenpflug

INVENTORS:
Wm Sellers
J. Sellers Bancroft
Carl G. Barth (No Model.) 11 Sheets—Sheet 10.
W. SELLERS, J. S. BANCROFT & C. G. BARTH.
TESTING MACHINE.

No. 552,873. Patented Jan. 7, 1896.

WITNESSES:
John L. Phillips
W. H. Hassenplug

INVENTORS
Wm Sellers
J. Sellers Bancroft
Carl G. Barth (No Model.) 11 Sheets—Sheet 11.

W. SELLERS, J. S. BANCROFT & C. G. BARTH.
TESTING MACHINE.

No. 552,873. Patented Jan. 7, 1896.

WITNESSES:
John L. Phillips
W. H. Hassenpflug

INVENTORS:
Wm Sellers
J Sellers Bancroft
Carl G Barth
per Wm Sellers atty

UNITED STATES PATENT OFFICE.

WILLIAM SELLERS, JOHN SELLERS BANCROFT, AND CARL G. BARTH, OF PHILADELPHIA, PENNSYLVANIA, ASSIGNORS TO THE WILLIAM SELLERS & COMPANY, INCORPORATED, OF SAME PLACE.

TESTING-MACHINE.

SPECIFICATION forming part of Letters Patent No. 552,873, dated January 7, 1896.

Application filed March 25, 1893. Serial No. 467,624. (No model.)

*To all whom it may concern:*

Be it known that we, WILLIAM SELLERS, JOHN SELLERS BANCROFT, and CARL G. BARTH, of the city and county of Philadelphia, in the State of Pennsylvania, have invented certain new and useful Improvements in Testing-Machines, of which improvements the following is a specification.

Some of these improvements are applicable to all forms of testing-machines, but most of them are applicable only to what is known as the "Emery" testing-machine, and they are therefore shown in the drawings in connection with this type.

In the Emery testing-machine a tensile strain on the specimen produces a compressive strain in the screws which connect the straining-head with the weighing-head, and a compressive strain on the specimen reverses the strain in these screws, whereas in lever testing-machines the strains upon these screws are the same whether the strains upon the specimen are of tension or of compression, so that machines of the first type may be designated as "reverse-strain" testing-machines. In reverse-strain testing-machines the tensile strains of a specimen are transmitted from the straining-head through the specimen to a movable beam, and by it through the hydraulic support to another beam which is fixed by the long screws or their equivalents, which transmit these strains back again to the straining-head.

In transmitting compressive strains the beam which was movable under tensile strains must be fixed, and that which was fixed must be movable, so that these beams can afford no support to each other, whereby a very large excess of metal is required for each of these beams over what would be required if these two beams could reinforce each other. The tensile strains in such machines are transmitted through a central draw-bar or by a yoke, while compressive strains do not pass through either the draw-bar or the yoke, which involves a further waste of material. The bed upon which the horizontal machine of this type is supported rests upon a foundation at or about the line of the floor and the recoil-springs, which, after a specimen is broken, restore the load-beams, straining-screws, and straining-heads to their normal positions, are removed as far as possible from the line of strain and far below the center of gravity of the whole apparatus, so that the action of these springs introduces an overturning moment in the parts restored. The members which connect the load-beams to the straining-head are rigidly connected to these parts, respectively, so that in recoiling all of these parts must move simultaneously and uniformly, but as there must be lost motion between the two load-beams the recoil must be transmitted from one to the other through the hydraulic support which produces sudden and severe strains upon the diaphragm thereof. The straining-head is moved toward and from the weighing-head by screws and by nuts geared together at fixed angular velocities, so that the alignment of the straining-head is dependent upon the coincidence of the screws, and as these are practically never exactly alike the pull upon the specimen is liable to be more upon one side than upon the other. The grippers in the self-tightening holder which seize the specimen are provided with serrated surfaces of uniform height, so that all parts of this surface grip the specimen at the same instant. The power required to produce the initial grip is therefore unnecessarily large, but no provision is made for following up the longitudinal movement of the grippers under the strain of the specimen, so that at fracture of the specimen such grippers instantly release the two ends of the specimen, the movements of which in recoiling are then erratic and are liable to injure the operator or the machine. In the scale-case the weights are supported upon two opposite sides only and are lowered upon similar supports suspended from the scale-beam, so that a sudden movement to lower or to raise a weight is liable to displace it upon its supports and cause it to fall upon the floor of its case. The operation of testing must therefore be stopped until such weight is replaced.

One object of our improvements therefore is to provide a common bed or weighing-head upon which all strains whether of tension or of compression are received and transmitted from and to the straining-head.

A further object is to provide a hydraulic support or supports within this bed which shall distribute all strains, whether of tension or of compression, equably about the axis of the bed.

A further object is to afford access to the hydraulic support or supports within the common bed without detracting from the rigidity of the bed.

A further object is to transmit all strains from the straining-head, whether of tension or compression, through the axis of the common bed and through the same hydraulic support or supports to the bed, and back to the straining-head.

A further object is to provide means for carrying the recoil from tensile strains through both divisions of the bed without passing these recoil strains through the diaphragm of the hydraulic support or supports.

A further object is to provide a surface or surfaces upon which the common bed and the straining-head of the machine may slide freely, said surfaces as nearly in the center of gravity of these movable parts as the use of the apparatus will permit, and in connection therewith to arrange the common bed and the straining-head so that their recoil shall be independent of each other.

A further object is to adjust the straining-head toward or from the common bed by an equalizing motion which will compensate for any irregularities in the mechanism of adjustment, and permit this head to be guided solely by the surface upon which it slides.

A further object is to provide surfaces for the grippers that seize the specimen, so that a slight initial compression will force the gripper into the specimen sufficiently to draw the grippers along the holder and tighten the grip as the tension increases.

A further object is to provide a support which will follow the specimen as it is drawn through the holder and prevent the grippers from recoiling within the holder when the specimen breaks, so that the parts of the specimen shall be securely gripped in the holder after the specimen is broken.

A further object is to support the weights in the scale-case, and to raise and lower them as required, so that they cannot escape from their supports in so doing.

A further object is to provide a means for automatically sliding the weights into a central position within their supports if from any cause they should escape therefrom.

To accomplish these ends, the nature of our invention consists in providing an annular beam or beams as a bed common to both tensile and compressive strains.

It further consists in dividing this bed into two parts transversely to the line of strain, so as to embrace a hydraulic support at the line of division without compressing it.

It further consists in bolting the two parts of this bed firmly together, outside of the hydraulic support, so that each half of the bed will afford support to the other and the whole will form one rigid bed.

It further consists in providing a central bar movable in the axis of this common bed and maintained therein by a flexible support at each end of the bed, upon the end of which bar all strains from the straining-head, whether of tension or of compression, are received and transmitted through the same hydraulic support or supports to the common bed.

It further consists in providing a hydraulic support or supports so disposed about the axis of this central bar as to receive and to transmit all strains from the bar without deflecting it.

It further consists in sustaining the hydraulic support or supports from this central bar by flexible connections which maintain the support or supports at the same distance from the axis of the central bar, while they permit movement longitudinally therewith.

It further consists in securing on the central bar upon each side of the hydraulic support or supports a series of ribs parallel with the axis of the central bar, the ends of which ribs will transmit pressure to the support or supports when required, and providing the interior of each half of the common bed with a similar number of ribs parallel with its axis, the ends of which ribs will receive the strains transmitted from the bar to the support or supports, the ribs upon the bar extending radially beyond those upon the common bed and alternating and interlocking therewith, so that such strains shall produce no overturning moment upon the support or supports.

It further consists in providing the hydraulic support or supports with an annular base, which projects beyond the hydraulic support or supports, to receive the thrust of a wedge or wedges which abut against the half of the common bed opposite that half which receives the tensile strains of a specimen, which wedge or wedges will force the circular base of the hydraulic support or supports against the half of the bed which receives the tensile strains, so as to transmit all recoil strains through the wedges without passing them through the diaphragm or diaphragms of the hydraulic support or supports.

It further consists in providing a weighing-head and a straining-head and uniting them by bolts through which all strains upon the specimen must pass; also in providing rotatable nuts upon these bolts for adjusting the position of the straining-head and for resisting the strain upon the specimen, while permitting a movement in the opposite direction sufficient for the recoil of the straining-head when the specimen breaks.

It further consists in adjusting the straining-head toward or from the weighing-head by screws, which connect one with the other, and nuts, the nuts geared together by equalizing-gearing, whereby any irregularity in the screws will be compensated for by a corresponding change in the angular velocities of the nuts, so that the alignment of this head will be determined by the bed upon which it rests.

It further consists in a self-tightening holder provided with grippers which close by the pull on the specimen, the grippers provided with serrations the line of apexes of which is inclined from the axis of the specimen, if this is flat; or if circular then a series of lines on top of the serrations would be conical, the base of the cone toward the middle of the specimen, whereby such grippers will seize the specimen first the farthest from its middle, and a slight initial pressure will securely fasten them together.

It further consists in providing a screw and nut in the axis of the holder and means for rotating the screw to force the grippers forward and produce an initial grip upon the specimen.

It further consists in providing means for rotating this screw automatically, so as to follow the grippers as they are moved within the holder by the strain upon the specimen.

It further consists in suspending the weights for the weighing-scale within a cage having three or more vertical ribs at right angles to the planes of the weights, from which ribs project inwardly planes of supports, upon which the weights may rest, and interlocking therewith a similar cage and supports by which the weights may be transferred from one cage to the other.

It further consists in providing these planes of supports with beveled surfaces exterior to the weights. Upon one or two of such bevels a weight must touch, if out of a central position in the cage, and thereby it will be forced to a central position before it can come to rest upon its plane of support.

To more fully describe our invention, we will now refer to the drawings which form part of this specification, in which—

Figure 1 represents a plan of the annular beam or weighing-head for the smaller machines in a horizontal section through the center of the main bars which connect it to the straining-head, showing the hydraulic support, the central bar partly in section, the flexible supports from the annular beam to the central bar, and the adjusting-screw which adapts the machine to weigh either a tensile or a compressive strain. The straining-head for this smaller machine is not shown, as there is nothing peculiar in its construction, it being preferably a hydraulic cylinder of the ordinary type. Fig. 2 is an end elevation of Fig. 1 in section at one side of the hydraulic support to show this support and its mode of suspension from the annular beam, as also by dotted lines the series of surfaces between which the hydraulic support is placed. Fig. 3 is a side elevation of this hydraulic support.

Figure 29:
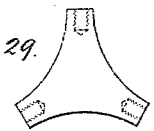
Figure 32:
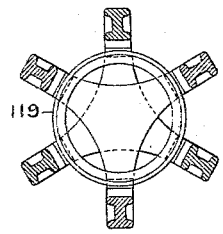
Figure 30:
Figure 31:
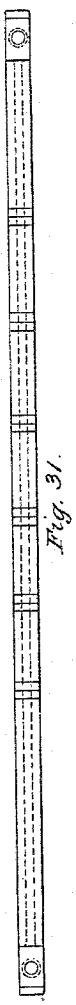
Figure 28:
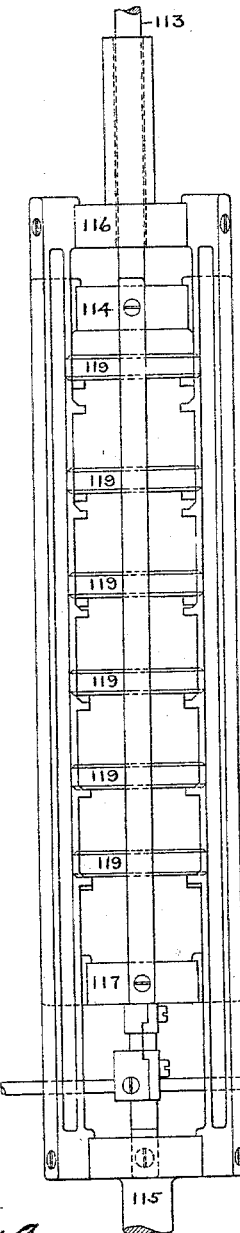
Figure 34:
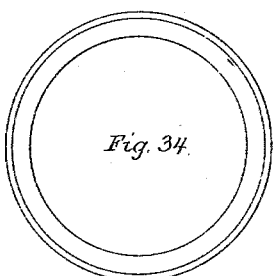
Figure 33:
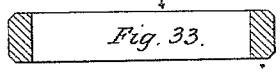
Figures 35, 36:
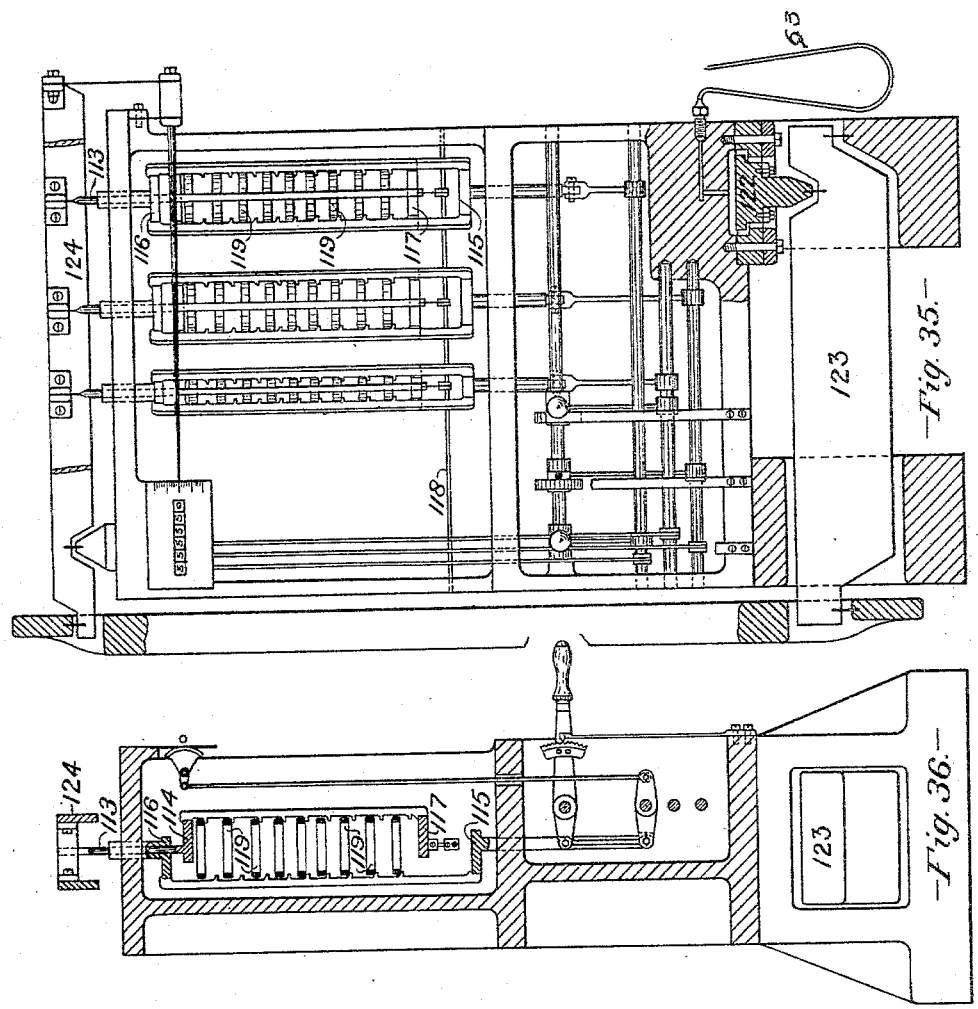
Figure 37:
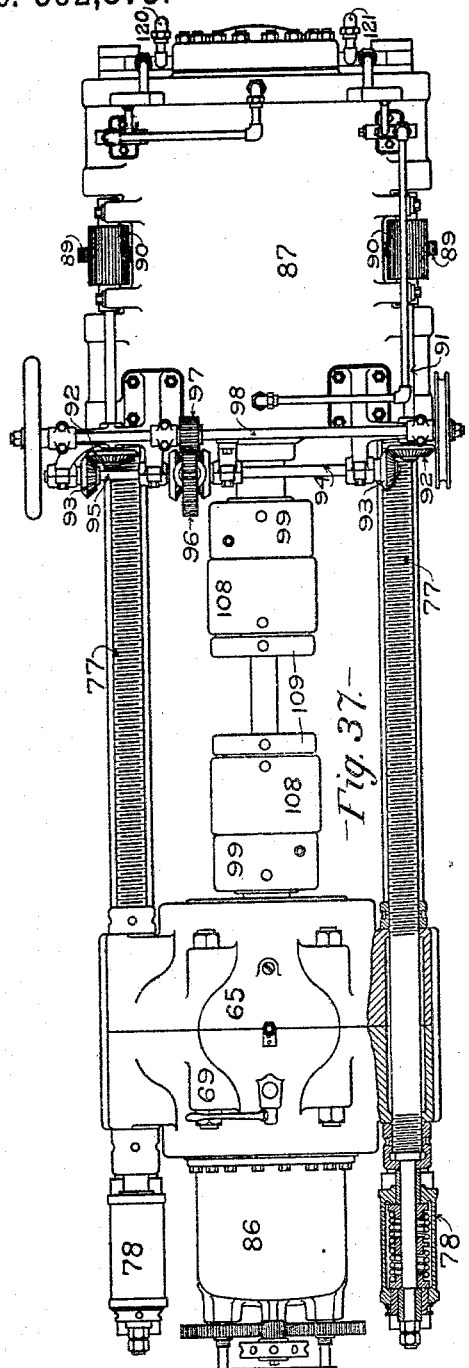
Figure 38:
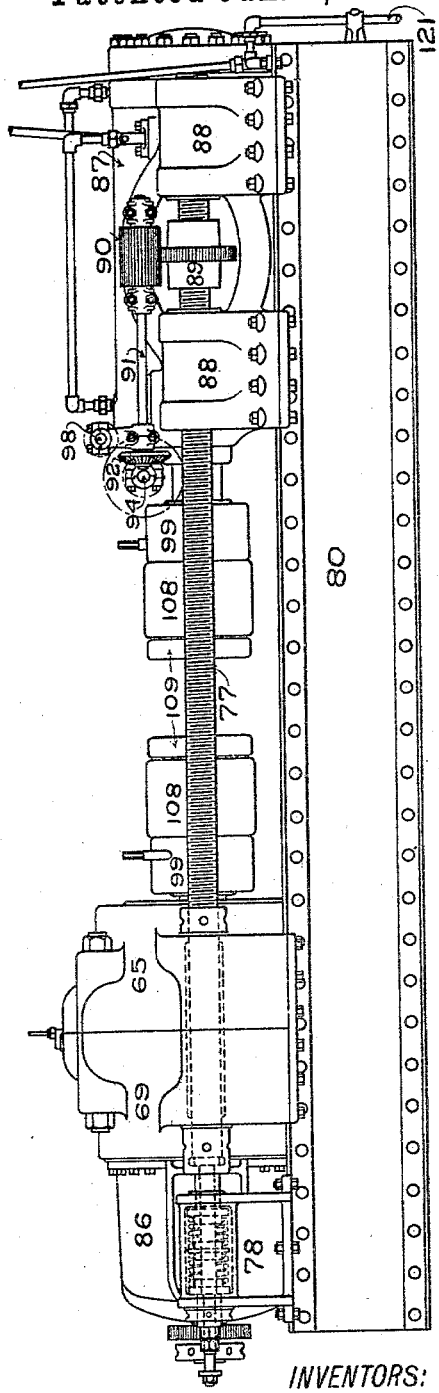

Fig. 4 is a section upon an enlarged scale through the center of this support. Fig. 5 is a horizontal section through the axis of the two annular beams and the hydraulic support between them which form the weighing-head for the larger machines. Fig. 6 is a side elevation of the spiral wedge and the annular base of the hydraulic support adapted thereto. Fig. 7 is a vertical section on the line A B, Fig. 5, showing the interior of one of the annular beams and the collar on central bar with the ribs on each. Fig. 8 is a plan of Fig. 6, to show the gear and the pinion, shaft, and handle to operate the same. Fig. 9 is a vertical section on the line C D of Fig. 10, to show the annular base with its circular hydraulic supports and the ends of the ribs of the collars on central bar and in the interior of the annular beam, the first of which transmit the strain to the hydraulic support and the latter receive this strain through the support. Fig. 10 is a horizontal section of a weighing-head with two annular beams in a plane parallel to the axis of the central bar, which is in plan with the collars thereon and the hydraulic support between them in section. Fig. 11 is a side elevation of the weighing-head, showing a portion of the bed which supports it and a recoil-box secured thereon, with the load-spring case behind the recoil-box, the whole forming one end of a testing-machine. Fig. 12 is a plan of the same. Fig. 13 is an end view of the same. Fig. 14 is a horizontal section of the recoil-box on a larger scale in a plane parallel to the main screw-bolts which connect the weighing-head to the straining-head, showing in the center the reduced end of one of these bolts. Fig. 15 is a side elevation of the straining-head and a portion of the bed which supports it, with the gearing and appliances for moving the straining-head on the bed when the portions of the bed shown in Figs. 11 and 15 are united at the broken line in the bed. The two figures will then represent a side elevation of a complete testing-machine. Fig. 16 is an end view of the same. Fig. 17 is a plan of the same. Fig. 18 is a section on an enlarged scale and in the axis of the rotatable nut for traversing the straining-head. Fig. 19 is a section on an enlarged scale of the equalizing-gear or epicyclic train for traversing the straining-head, said section being in a plane coincident with the axis of the shafts which support it. Fig. 20 is a side view of the spur-wheel of this train with the bevel-pinions which it carries in section. Fig. 21 is a horizontal section coincident with the axis of the self-tightening holder. Fig. 22 is a vertical section of the same in a plane coincident with the axis of the shaft which carries the hand-wheel. Fig. 23 is a section of the worm-wheel therein. Fig. 24 is an end view thereof, showing the spiral spring connected to the worm-wheel and to the screw in the axis of the holder. Fig. 25 shows a section of the nut for this screw and a plan of one of the circular plugs which carry the grippers with a gripper therein. Fig. 26 is a section of the two parts of one gripper on the line E F in Fig. 27, and Fig. 27 is an end view of the same. Fig. 28 is an elevation of the two cages which carry the weights from the scale-beam. Fig. 29 shows in plan the shape of the pieces which form the ends of these cages. Fig. 30 is a side view of the bars which form the sides of these cages. Fig. 31 is a front view of the same. Fig. 32 is a horizontal section of the two cages shown in Fig. 28. Fig. 33 is a section of one of the weights, and Fig. 34 is a plan of the same. Fig. 35 is a side elevation of the scale-case, its levers, weights, weight-cages, and index, the shafts and levers for actuating the weight-cages, and the hydraulic support which receives the pressure from the hydraulic support or supports in the testing-machine. Fig. 36 is a front elevation of the same. Fig. 37 is a plan of the complete testing-machine, and Fig. 38 is a side elevation of the same.

In all of the figures similar numerals indicate similar parts.

The weighing-head, Fig. 1, is composed of an annular beam 40, provided with a lug on each side, as shown in Fig. 2, through which pass the bolts 41 which connect this head with the straining-head. These bolts are turned to fit the holes in the weighing-head accurately, and are secured therein by the pins 42, which are prevented from coming out by the covers 43, which are screwed fast to the annular beam. Through the axis of this beam and parallel with the bolts 41 is a round hole, the outline of which is shown in Fig 1, and at right angles with this is a rectangular hole, the outlines of which are shown in Figs. 1 and 2. The first serves to receive the central bar 44, through which it must play freely without touching the annular beam, in the axis of which it is supported parallel to and in the same plane as the bolts 41 by flexible circular diaphragms 45, which are secured to the beam and to the bar. The end of the bar 44 is bored out to receive the self-tightening holder, which is screwed into it securely. This end of the central bar is provided with ribs, as shown in Fig. 1 and by dotted lines in Fig. 2, and corresponding interlocking ribs are provided in the annular beam, as shown by dotted lines in Fig. 2. The ends of these ribs are dressed off in a plane perpendicular to the axis of the central bar and the annular beam. Upon the other end of the central bar is a collar 46 provided with ribs similar to those first described, and corresponding interlocking ribs are provided in this end of the annular beam. The ends of these ribs are dressed off in a plane perpendicular to the axis of the central bar and the annular beam, and consequently the ends of these ribs will be opposite to and parallel to the ends of the ribs upon the other end of the central bar and the annular beam, respectively. The position of the collar 46 on the central bar is determined by the shoulder on this end of the bar, and it is firmly pressed against this shoulder and secured to the central bar by the nut 47. The rectangular hole in the annular beam is provided for the annular hydraulic support 48 which surrounds the central bar and very nearly fills the space between the ends of the ribs on the interior of the annular beam. This annular hydraulic support is suspended by links 49 from lugs 50, bolted to the sides of the rectangular opening, the position of the hydraulic support being concentric with the central bar.

When a tensile strain is exerted upon a specimen, the central bar will be drawn toward the straining-head and the ends of the ribs on the collar 46 will press against the hydraulic support, forcing it against the ends of the ribs on the opposite side of the support, which ribs are on the interior of the annular beam. The position of the hydraulic support is then fixed and the strain upon the specimen is measured by the pressure upon the fluid in the hydraulic support. A compressive strain upon a specimen will force the central bar from the straining-head and the ends of the ribs on the bar will press the hydraulic support against the ends of the ribs on the interior of the annular beam opposite those first referred to as receiving the tensile strains. The necessity for the interlocking ribs will now be apparent, for if the surfaces on the annular beam and the central bar were cylindrical it is evident that those upon the bar must be smaller in diameter than those upon the annular beam, and consequently the strains could not be direct and would therefore tend to distort the hydraulic support and to rupture the diaphragm, whereas, the ribs interlocking, the strains are direct and it is only requisite to provide sufficient depth of this support to bridge from the end of one rib to that of another with safety. To set this hydraulic support in the proper position for testing a specimen, it is only requisite to draw it with a definite force against the ends of the ribs on the annular beam, which will receive the strain from the specimen. To effect this purpose, a flat bar-spring 51 is bolted to the ends of the main bolts 41. Through the center of this spring passes a screw-bolt 52, one end of which screws into the end of the central bar while the other end is supported in the spring 51. On the outer end of 52 is mounted a hand-wheel keyed to the screw-bolt, which on the opposite side of the spring is provided with a shoulder, the space between this shoulder and the hub of the hand-wheel being sufficient to permit the screw-bolt to turn freely. By turning the hand-wheel therefore the central bar will be drawn toward or forced from the spring and the annular hydraulic support will be pressed against the ends of the ribs on the interior of the annular beam accordingly. To define this pressure, a cap 53 is bolted to the nut 47, through the center of which cap the screw-bolt 52 passes freely, the end of the hole in 53 next the central bar being enlarged to receive a collar on 52. The screw-bolt 52 can then be turned only until the collar brings up on the end of the central bar 44, or upon the shoulder in cap 53, and the pressure which the spring 51 can exert upon the central bar will be limited accordingly. The screw-bolt 54 in the cap 53 enters the end of the central bar 44 and locks the nut 47 upon this bar. The load-springs 55 for the annular hydraulic support are shown in Figs. 2, 3 and 4. They supplement the strain produced by the bar-spring 51. In larger machines a series of coiled springs exert this loading strain upon the end of the central bar, but as they form no part of our invention it is unnecessary to describe them or to refer to them further than as necessary accompaniments of the hydraulic support in the Emery testing-machine.

The details of the annular hydraulic support 48 are shown in Fig. 4, which is a section upon an enlarged scale through the center of this support. The annular base 56 is of sufficient depth to sustain without appreciable deflection the strain from the specimen transmitted through the hydraulic support to the ends of the ribs in the annular beam. The annular hydraulic support is constructed like the circular supports heretofore used in the Emery testing-machine, except that as there is a large hole through the center the diaphragm must be clamped by two circular and parallel clamps in place of the one in a circular support, and as the strains in our machine must be received upon a series of surfaces in place of the continuous one in the Emery machine the annular support must be provided with a base on each side of the diaphragm capable of bridging the space between the surfaces without appreciable deflection. To prevent any side strains upon the diaphragm the clamp 57, which clamps the edges of the two annular brass plates between which is the fluid for compression, is composed of a ductile metal, preferably soft steel, turned out as shown, to receive the annular plate 58, which rests upon the top of the diaphragm—that is to say, that one of the brass plates which is movable. The side of this plate 58 farthest from the diaphragm is provided with a circular groove in which fits a tongue 59, formed on the under side of an annular bar 60, which is connected to the two sides of the clamp 57 by thin metal to render the plate 58 and bar 60 movable in a line perpendicular to the diaphragm but immovable in a plane parallel to the diaphragm. The outer side and the edges of this bar 60 are turned to fit accurately in the groove provided for it in the base 61, so that when the whole apparatus is mounted, as shown, the two bases 56 and 61 may have a slight movement toward or from each other, but with reference to each other they are immovable in other directions. The set-screws 62 with lock-nuts are provided for the purpose of forcing the two bases 56 and 61 apart when it is desired to fill the space under the diaphragm with fluid, which is admitted through the pipe connection 63. (Shown in Fig. 2.) This connection and the mode of operating it is the same as in the circular hydraulic supports heretofore used in Emery testing-machines.

The weighing-head, Fig. 5, comprising two annular beams with an annular hydraulic support between them, which in the larger machines is substituted for the weighing-head shown in Fig. 1, is shown in section in a plane which passes through the axis of the central bar. The annular hydraulic support is similar to that already described, except that the annular base 64, which transmits tensile strains to the annular beam 65, is enlarged, and a projection from it 66 partially incloses the hydraulic support. The end of this projection is dressed to a spiral to correspond with a spiral wedge 67. (Shown in Fig. 6.) The rim of this wedge is provided with teeth for a suitable distance, as shown in Fig. 8, and a pinion on the end of the shaft 68 serves to turn the wedge about the axis of the central bar and force the annular base 64 against the ends of the ribs in the annular beam 65. The effect of this will be to prevent the recoil strain, when a specimen under tension breaks, from passing through the diaphragm of the annular hydraulic support, as such strain can then pass only through the spiral wedge 67 to the annular beam 69. The central bar 70 has on each side of the hydraulic support a collar 71 provided with ribs, and similar interlocking ribs are provided on the interior of the two annular beams 65 and 69. These ribs are shown in section in Fig. 7. An annular flexible plate 72, clamped to the outer ends of the annular beams and to the outer ends of the two collars, serves to maintain the axis of the central bar in the axis of the two annular beams, while permitting a small movement longitudinally. A similar annular flexible plate 73, clamped on each annular base of the hydraulic support and to the central bar, serves to maintain the axis of the hydraulic support in the axis of the central bar while permitting the bar to move longitudinally. The pipe connection 63, through which the space under the diaphragm is filled with fluid and through which the fluid-pressure is transmitted to the weighing-scale, is the same as that shown in Fig. 2. The screw-bolts 74 are merely stoppers to fill the holes provided as nearly as possible in the center of gravity of each annular beam, into which eyebolts may be screwed for the convenience of handling these heavy beams. For the largest machines an annular hydraulic support would be difficult to construct, as well as to rate—that is, to adjust so as to weigh accurately it would require a very large rating-scale as well as one enormously strong if the rating is carried near to the capacity of the support. To avoid this difficulty we provide a series of circular hydraulic supports, as shown in Fig. 9, mounted upon two annular bases 75 and 76, Fig. 10, in which 76 is provided with the projection which partially incloses the hydraulic supports, the end of this projection being dressed to a spiral to correspond with the spiral wedge 67 previously described. As thus arranged, the hydraulic supports can be rated individually in a rating-scale adapted to testing-machines of ordinary capacity, and when assembled as shown their aggregate capacity may be anything that is required. Each one of these hydraulic supports is provided with a pipe connection, through which the space under its diaphragm is filled with fluid and through which the fluid-pressure is transmitted to the most convenient point for uniting all of these pipes with the pipe 63, through which the fluid-pressure is transmitted to the weighing-scale.

The weighing-head comprising two annular beams with an annular hydraulic support between them is shown in elevation mounted upon its bed in Fig. 11. The screw-bolts 77 serve to connect the two annular beams together as well as to connect the weighing-head with the straining-head, and through these bolts all the strains upon a specimen must pass. The ends of these bolts are turned smaller to pass through the recoil-box 78, and in the center of each box a collar 79 is loosely fitted upon each bolt, as shown in Fig. 14. These boxes are firmly secured to the bed 80, and on each side of the collar 79 is a heavy spring, one end of which is mounted upon the collar 79 while the other is supported upon the collars 81 and 82, which are loose upon the small end of the screw-bolt 77. The rear end of the recoil-box is provided with an annular screw 83, the outer end of which is enlarged and provided with holes to receive the end of a spanner-wrench, by which the screw may be turned and the springs may be compressed to give them the requisite tension. The outer ends of the bolts 77 are provided with jam-nuts, between which and the collars 81 are sleeves 84, and between the collars 82 and the large nuts which secure the bolts 77 to the two annular beams are similar sleeves 85, two of which sleeves slide freely in the annular screws 83 and two in the ends of the recoil-boxes 78. The jam-nuts are then adjusted so as to produce close contact or a slight pressure upon the collars 81 and 82, which determines the position of the weighing-head upon the bed 80. With a specimen under tension the screw-bolts 77 will be compressed, and when the specimen breaks the recoil of these bolts will carry them and the weighing-head toward the recoil-box. As this box is secured to the bed 80, the springs will be compressed until the force of the recoil is expended, when the increased tension upon the springs will restore the weighing-head and the screw-bolts to their original position. The load-springs for producing an initial tension upon the hydraulic support are within the casing 86, which sustains the gearing required for operating the adjusting-screws; but as these perform a similar function to that already described and moreover form no part of our invention a further description thereof is unnecessary.

The straining-head is shown in side elevation in Fig. 15, mounted upon the bed 80, and like the weighing-head it slides freely upon this bed, its position thereon being determined by the screw-bolts 77, which connect it to the weighing-head. This straining-head comprises a hydraulic cylinder 87, provided with heavy lugs 88, which serve to support the cylinder upon the bed 80 and to carry the screw-bolts 77. Between these lugs are placed the geared nuts 89, mounted upon the screw-bolts 77, the distance between the lugs being such that the geared nuts 89 may be rotated upon the screw-bolts a distance at least equal to the greatest recoil of the bolts without moving the head. The geared nuts 89 are shown in section upon an enlarged scale in Fig. 18. With a specimen under tension the screw-bolts 77 must be in compression, and the ends of the nuts 89 must be in contact with the outermost of the lugs 88. When the specimen breaks, the recoil of the screw-bolts 77 will shoot the straining-head away from the weighing-head until its movement is arrested without shock by friction upon the upper surface of the bed 80 which supports it.

When a fresh specimen is placed in the machine, the strain upon it will draw the straining-head toward the weighing-head until the lugs 88 are again in contact with the geared nuts 89, when the operation of testing will proceed as before. The geared nuts 89 are operated by the pinions 90 mounted upon the shafts 91. On the outer ends of these shafts are the bevel-wheels 92 driven by the pinions 93 mounted upon the shafts 94 and 95. These shafts 94 and 95 are driven by the epicyclic train 96, operated by the pinion 97 mounted upon the shaft 98, upon one end of which is a hand-wheel and on the other a cord-pulley or a belt-pulley for operating this shaft by hand or by power. The epicyclic train 96 is shown in section upon an enlarged scale in Fig. 19 and the spur-wheel of this train is shown in elevation in Fig. 20, with the bevel-pinions mounted therein shown in section. As this form of train is very old and is familiar to every skilled mechanic it is not necessary to describe it, but as the shafts 94 and 95 are both driven by it they can only be driven at a uniform rate when the resistance upon one is the same as that upon the other. The strain upon the two sides of the straining-head must therefore be the same whether the screw-bolts 77 are of uniform pitch or otherwise, so that the alignment of this head will be determined by the bed which supports and guides it, and not by the screw-bolts and revolving nuts which move it. One of the self-tightening holders is shown in section in Fig. 21 mounted upon the end of the piston-rod of the straining-head, which is represented as broken off just back of the holder. Fig. 22 is a section of the same at right angles to that in Fig. 21 and in the axis of the hand-wheel shaft shown in both figures. The other holder is mounted upon the end of the central bar 70, but as they are both alike, except as to the piece which attaches the one to the piston-rod and the other to the central bar, we shall describe the one shown with connection to the piston-rod. It consists of a cylindrical piece 99 screwed upon the collar 100, which is fastened upon the end of the piston-rod by a screw-thread and locked thereon by the small bolt 101. The interior of the cylindrical piece 99 is bored out next the collar 100 to receive the worm-wheel 102. (Shown in section in Figs. 21 and 23.) This worm-wheel is clutched upon the end of the screw 103 by projections shown in section in Fig. 23 and by dotted lines in Fig. 24, which is a view of this wheel 102 on the end of screw 103 at right angles with the section shown in Fig. 23. Similar projections are provided on the end of the screw 103, the projections upon both wheel and screw being no wider, circumferentially, than is required for strength, so as to leave as much lost motion between them as possible, as shown in Fig. 22. On the extreme end of the screw 103 a washer 104 is securely fastened and provided with a slit, (shown in Fig. 24,) into which one end of the spiral spring (also shown in this figure) is securely fastened. The other end of this spring is securely fastened in a similar slit in the wheel 102, as shown in Figs 23 and 24. The worm-wheel 102 is rotated by means of the worm 105 and the hand-wheel shown in Figs. 21 and 22. The screw 103 engages with the circular nut 106 mounted in the piece 99, which at this part of its interior is bored out to receive it. The end of this circular nut beyond 99 is closed by a circular plate which carries a T-bar, (shown in Fig. 25,) the use of which will be explained later. It may be desirable in some self-tightening holders to make this circular nut 106 a part of the worm-wheel 102, in which case the screw 103 would be attached to the circular plate above described as closing the end of the circular nut 106. On the outer end of the cylindrical piece 99 is mounted the circular piece 107, secured to 99 by the sleeve 108, which screws onto 99, for which purpose it is provided with holes at one end to receive a spanner-wrench. A shoulder on the interior of 108 and a corresponding shoulder on the exterior of 107 afford the means by which the circular piece 107 may be clamped against the end of 99. The outer end of 107 is provided with a screw-thread, onto which the flanged collar 109 is screwed. This outer end of 107 beyond the screw is turned to a true plane at right angles to the axis of the holder to receive the compression-table, which is secured to 107 by the screw on which the flanged collar 109 is screwed. This collar is placed on 107 merely to protect the screw and the end which receives the compression-table when the machine is employed upon other tests than those of compression, but as this table forms no part of our invention further reference to it is unnecessary.

The interior of the circular piece 107 is bored with two holes, the opposite sides of each parallel, their axes and that of the holder in the same plane, but those of the holes inclined to that of the holder, as shown in Fig. 21, which represents the outer sides of these two holes. In each hole is fitted a circular plug 110, (shown in Figs. 21 and 25,) and to permit both to enter 107 at the same time each plug is cut away so as to be parallel to the axis of the holder when in place within 107, as shown in Figs. 21 and 25. The rear ends of these plugs are planed at right angles with the surface of the plugs where they have been cut away, and are fitted to the T-bar on the circular plate which closes the end of the circular nut 99. To put this part of the holder together, the circular plugs are mounted upon the T-bar and the circular piece 107 is entered upon the ends of the plugs and pushed toward the cylindrical piece 99, which will slide the plugs on the T-bar toward the axis of the holder until 107 is in contact with 99, when the sleeve 108 is screwed onto 99 and secures the whole, as shown in Fig. 21. When in this position, if the screw 103 is revolved the circular nut 106 will be forced outward or be drawn inward and carry with it the two circular plugs 110, which will have the effect to make their surfaces which are parallel to the axis of the holder approach toward or recede from each other. To make provision for the grippers, the screw 103 is revolved so as to force the two surfaces of the circular plugs which are parallel to the axis of the holder into close contact with the thin plate between them. This plate is merely to provide the necessary clearance after they are bored, as next described. A hole is then bored in the axis of the holder, one part of which will be in one plug and one part in the other, and of the shape shown in Fig. 21—that is to say, circular of two diameters, the smallest at the outer end, the connection between the two sizes being beveled, as shown, to form a shoulder against which the grippers are pulled by the specimen, the beveled shoulder permitting an easy change of grippers to suit different specimens. The grippers are in two parts, the exterior cylindrical conforming to the cavity in the plugs and the interior conforming to the shape of the specimen, the rear portion 111 provided with serrations, while the front 112 is plain, as shown in Fig. 26. The grippers and circular plugs are shown in section in Fig. 21 and in plan in Fig. 25. The line of serrations is preferably parallel with the axis of the holder at the bottom, but should be inclined to this axis at the top, so that the top of the tooth at the rear end of the gripper will seize the specimen first. To facilitate the initial grip we make the tooth at the rear sharp, or nearly so, and each successive one more and more flattened off, as shown in the drawings. This initial grip is effected by rotating the worm 105, so as to turn the screw 103, by means of the worm-wheel 102, through the clutch shown in Fig. 22. The rear tooth of the gripper 111, which is the sharpest of the series, can be thus readily forced into the specimen sufficiently to make it certain that the pulling strain upon the grippers will draw the circular plugs 110 forward, and by so doing will force the teeth of the grippers 111 deeper and deeper into the specimen until this movement is arrested by the surface of the smooth gripper 112 coming into contact with the specimen or by the resistance to further compression by the teeth balancing the strain upon the specimen. To permit the plugs 110 to be drawn forward in the holder, it is necessary that the screw 103 shall be rotated as the plugs are drawn forward, and this is accomplished by the spiral spring shown in Fig. 24. The tension of this spring will be increased by rotating the worm-wheel 102 until the clutch-surfaces come in contact, which they must do to produce the initial grip upon the specimen, and when the thrust upon the screw 103 necessary to produce the initial grip is relieved by the forward movement of the plugs 110 the spiral spring will rotate the screw 103 and cause the circular nut 106 to follow up the plugs. This automatic movement of the screw 103 maintains a constant pressure by the circular nut 106 against the inner ends of the plugs 110, so that when the specimen breaks no recoil of the parts within the holder is possible, and the grip upon the specimen is maintained until relieved by turning the worm-wheel 102 in the opposite direction from that required to produce the grip.

To prevent the weights from falling or becoming disarranged in the weighing-scale, we provide two cages, Fig. 28, one suspended from a weighing-beam by the rod 113, which is connected securely to the triangular head-piece 114, like that shown in plan in Fig. 29, the other supported by the rod 115, which forms part of the triangular base similar to 114. This rod 115 and the cage to which it is attached are raised and lowered by hand by means of a lever the fulcrum of which is in or secured to the scale-case. The upper end of this cage is formed of a triangular head-piece 116, like the base, from the upper side of which projects a long hub which passes through the framework of the scale-case, so that at each end this cage is maintained in position by the scale-case. The cage is formed by three bars which unite the base 115 to the head-piece 116. These bars are shown in side elevation in Fig. 30 and in front elevation in Fig. 31. The cage which is suspended from the weighing-beam by the rod 113 is composed of a triangular head-piece 114, united by three bars, such as are shown in Figs. 30 and 31, to the triangular base 117. (Shown also in plan in Fig. 29.) The axes of these two cages are in the same line and they interlock, as shown in Fig. 32. To admit of this axial arrangement the long hub of the head-piece 116 is bored out large enough to permit the rod 113 to pass through it without touching it, and the lower end of the cage supported by 113 is steadied by rods 118 from the scale-case, which are flattened very thin to permit vertical movement, while they prevent horizontal movement in every direction. The projections on the inside of the bar shown in Fig. 30 form with the other two bars of each case planes of support for the weights 119, and as the two cages interlock, as shown in Fig. 32, the weights are surrounded by six bars, which effectually prevent them from being displaced by any sudden jerk. It is not only necessary to prevent the weights from falling out of their supports, but it is also requisite to maintain the axes of the weights and cages in the same line, and for this purpose the planes of supports on the inside of the bars which form the sides of the cages are supplemented by inclined surfaces which terminate in the planes of support at the circumference of the weights, as shown in Fig. 30. The weights are shown upon an enlarged scale in section in Fig. 33 and in plan in Fig. 34. The outer corners are beveled to conform to the inclined surfaces outside the planes of support, so that if a weight should be displaced laterally it must slide into its true axial position before it could come to a rest upon its plane of support.

The operation of the machine as a whole, which I have heretofore described in detail, is as follows: As previously stated, Figs. 11 and 15 represent the side elevation of a complete testing-machine. The screw-bolts 77, which connect the weighing-head with the straining-head, and the bed 80, upon which both of these heads are supported, may be of any length required and are represented as broken off, so that if these two figures are so placed that the broken ends of the parts aforesaid are toward each other the total effect will be a side elevation of a complete testing-machine.

The operation of the several parts heretofore described will be understood from the description of a test for longitudinal strength. The straining-head must be first adjusted upon the bed, so that one end of the specimen may be gripped by the self-tightening holder on the weighing-head when the other end is gripped by a similar holder on the straining-head. In making this first adjustment it is necessary that provision shall be made for a sufficient movement of the piston and rod which produces the strain, so that the extension of the specimen before rupture shall not take up all of the movement provided for. The fluid-pressure which produces the movement of the piston and rod in the straining-head may be obtained from an accumulator or from a suitable force-pump, as is well understood, and it is admitted to one end of the straining-cylinder by the pipe 120 at the end of the bed 80, and to the other end of this cylinder by the pipe 121, (see Figs. 15 and 17,) from whence it is carried to and from the straining-cylinder by the hinged-joint pipe connections described in the Emery patent, No. 278,916, dated June 5, 1883. When the fluid-pressure is admitted to pipe 120, the pipe 121 becomes the exhaust, and vice versa. The mode of procedure for securing the ends of the specimen in the respective holders has been already described, after which nothing remains but to admit pressure to that end of the straining-cylinder which will produce tension in the specimen. The behavior of the specimen under strain may then be noted, and the rate of its extension or of its entire relief from strain may be governed at will. The strains exerted upon the specimen, whether transmitted to the circular or to the annular support in the testing-machine hereinbefore described, are from it transmitted through the pipe 63 to the hydraulic support 122 in the scale-case, as shown in Fig. 35, from which it is transmitted through the lever 123 to the scale-beam 124, upon which latter the weight-cages hereinbefore described are suspended. The weights in these cages are raised and lowered by means of hand-levers and rock-shafts, as shown in Fig. 36, each weight-cage being provided with its rock-shaft, index connection and handle, whereby each cage may be operated entirely independent of the others and its every movement indicated to the eye of the operator.

Having now stated the object and the nature of our improvement, and described and illustrated the same by drawings, what we claim as new, and desire to secure by Letters Patent, is—

1. In a testing machine, an annular beam or bed common to both tensile and compressive strains from the specimen, in combination with a hydraulic support, transverse to the line of strain and midway on this line, between the ends of the bed.

2. In a testing machine, an annular beam or bed common to both tensile and compressive strains from the specimen, and divided transversely to the line of strain, in combination with a hydraulic support at the transverse division.

3. In a testing machine, an annular beam or bed common to both tensile and compressive strains from the specimen, and divided transversely to the line of strain, with a hydraulic support at the transverse division, in combination with means for securing the two parts of the bed firmly together, outside of the hydraulic support, so that each part of the bed will afford support to the other, and the whole will form one rigid bed.

4. In a testing machine, an annular bed, in combination with a central bar movable in the axis of this bed and maintained therein, by a flexible support or supports at each end of the bed.

5. In a testing machine, an annular bed, provided with a central bar movable in the axis thereof, in combination with an annular hydraulic support sustained in the axis of the central bar and movable therein.

6. In a testing machine, an annular bed, provided with a central bar movable in the axis thereof, in combination with two or more hydraulic supports, so arranged about the axis of the central bar as to divide the strain upon the bar equally upon the hydraulic supports.

7. In a testing machine, an annular bed, provided with a central bar movable in the axis thereof in combination with a hydraulic support or supports sustained concentrically therewith, by a flexible connection or connections, between the hydraulic support or supports and the central bar.

8. In a testing machine, an annular bed, and a central bar movable in the axis thereof, provided with two series of radial rib projections secured to the bar, in combination with two series of radial rib projections on the interior of the bed, alternating and interlocking with those on the bar.

9. In a testing machine, a hydraulic support or supports mounted upon an annular base which extends outside of such supports, in combination with a wedge or wedges which will force this base in the direction that a tensile strain upon the specimen would draw it.

10. In a testing machine, a weighing head and a straining head united by bolts, through which bolts, all strains upon the specimen must pass, in combination with rotatable nuts upon these bolts which adjust the straining head to any position, but when adjusted they resist movement of the straining head in one direction and admit of a limited movement in an opposite direction.

11. In a testing machine, a weighing head and a straining head united by bolts, through which bolts, all strains upon the specimen must pass, in combination with rotatable nuts upon these bolts, connected with each other by equalizing gearing.

12. In a testing machine, a self tightening holder, provided with grippers which close by the pull on the specimen, in combination with serrations in the grippers at right angles with the line of strain, and with their line of apexes, inclined to the surface they seize, so that the apex of the serration farthest from the middle of the specimen, must seize it first.

13. In a testing machine, a self tightening holder provided with grippers which close by the pull on the specimen, in combination with a screw and nut in the axis of the holder to close or to open the grippers and to maintain their position against the recoil of the specimen.

14. In a testing machine, a self tightening holder provided with grippers which close by the pull on the specimen, and a screw and nut in the axis of the holder, to operate the grippers, in combination with means for rotating the screw automatically, so as to follow the grippers as they are moved within the holder, by the strain upon the specimen.

15. In a testing machine, a cage comprising three or more vertical ribs supported by a weighing beam and provided with projections from each rib to form planes of support for weights one above another, in combination with a similar cage interlocking with the first and movable vertically at will, so as to lift or to lower the weights *seriatim* from or to the weighing beam cage as required.

16. In a testing machine, two cages comprising respectively three or more vertical ribs interlocking with each other, one supported by a weighing beam, the other movable vertically at will and both provided with projections from each rib, the upper sides of which present two surfaces, those next to the rib inclined, the others flat, in combination with cylindrical disk weights or rings of a diameter to cover the flat surfaces of the projections.

WM. SELLERS.
    J. SELLERS BANCROFT.
    CARL G. BARTH.

Witnesses:
 JOHN L. PHILLIPS,
 W. H. HASSENPLUG.